Feb. 8, 1966 CHIA Y. HSUEH ET AL 3,234,529

SEMI-PERMANENT MEMORY

Filed Oct. 23, 1962

INVENTORS
CHIA Y. HSUEH &
DAVID E. WILLIAMS

BY Carl V. Olson
Attorney

United States Patent Office 3,234,529
Patented Feb. 8, 1966

3,234,529
SEMI-PERMANENT MEMORY

Chia Y. Hsueh, Levittown, Pa., and David E. Williams, Stratford, N.J., assignors to Radio Corporation of America, a corporation of Delaware Filed Oct. 23, 1962, Ser. No. 232,404
6 Claims. (Cl. 340—174)

This invention relates to so-called semi-permanent read-only memories of the type wherein any selected information word may be read out electronically, and wherein the words stored in the memory are determined by the physical configurations of manually interchangeable members.

There are applications in electronic data processing apparatus for both random access memories and read-only memories. A read-only memory is one wherein the storage of information is relatively fixed by the mechanical or physical configuration or construction of the memory, and wherein the stored information can be electrically or electronically read out as frequently as is desired without destroying the stored information. Punched cards are an example of a read-only memory wherein each card is employed for the storage of one or more words. Punched cards are usually read one card at a time in time sequence. It is desirable to have a read-only memory capable of storing a large number of words, and having means for electronically addressing any selected one of the word locations for reading out the selected stored word. It is also desirable to have an electronically addressable read-only memory permitting of the convenient manual substitution of stored information words in the memory. It is additionally desirable in many instances to have a read-only memory capable of storing information in tertiary form wherein each bit of each stored information word represents a "+," a "—" or a "0."

It is a general object of this invention to provide an improved fixed or read-only memory wherein the storage of tertiary digital information is determined by the configuration of conductors linking apertures in a plurality of magnetic cores.

It is another object to provide an improved read-only memory construction which permits the changing of stored tertiary digital information by substituting mechanical members determining the stored information.

It is a further object to provide an improved read-only memory wherein stored tertiary digital information is determined by the presence and location of holes punched in a sheet having a printed circuit thereon.

It is yet another object to provide an improved read-only memory for the storage and reading of tertiary information, that is, one wherein each bit of information is represented by one of three states or values.

According to an example of the invention, there is provided a plurality of two-apertured magnetic cores, there being as many cores as there are information bits in each of the words to be stored in the memory. The magnetic cores are each constructed of an E-shape magnetic member having a removable magnetic bar located across the central and side legs to define a magnetic core having two apertures. The primary winding conductors are conductors that are printed in a ladder-pattern on an insulating sheet arranged to be inserted on the E-cores so that the conductors go through the apertures of the cores when the bars are in place. The printed winding sheets and the conductors thereon are punched out at selective points to determine the information bits of the stored word on each sheet. Words of stored information can be changed by merely substituting one punched primary winding sheet for another. Information is read from the memory by energizing a selected one of the conductors on a printed sheet and sensing the signals induced on secondary windings on each magnetic core.

The ladder-pattern printed primary conductor on an insulating sheet is punched (for the storage of tertiary information) in such a way that a remaining conductive path through one of the apertures of a core provides for the storage of a "+," a conductive path through the other aperture of a core provides for the storage of a "—" and conductive paths through both apertures of a core provide for the storage of a "0."

These and other objects and advantages of the invention will be apparent to those skilled in the art from the following more detailed description taken in conjunction with the appended drawing, wherein.

Figures 1, 2, 3:
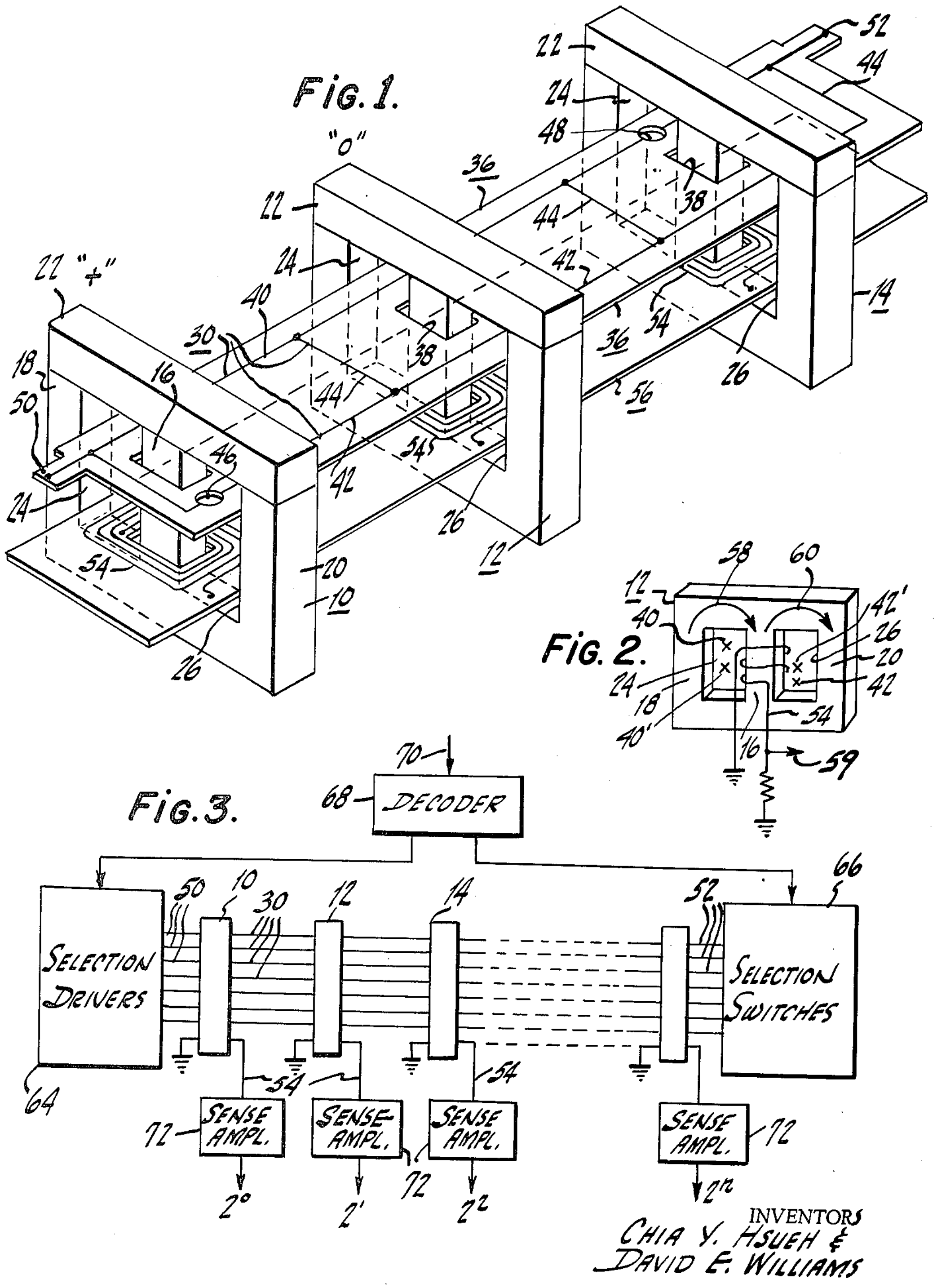
FIGURE 1 is a perspective view of a semi-permanent read-only memory constructed according to the invention wherein there is illustrated the storage of one three-bit word wherein each bit is in tertiary form representing a "+," a "—" or a "0."
FIGURE 2 is a representation of a single core which will be referred to in describing the operation of the memory of FIGURE 1.
FIGURE 3 is a block diagram of a fixed memory including the construction of FIGURE 1 and including associated electronic circuits.

Reference will now be made in greater detail to FIGURE 1 of the drawing which includes three magnetic cores 10, 12 and 14 each having E-shaped members with a central leg 16 and two end legs 18 and 20. A magnetic bar 22 is positioned at the ends of the legs of each E core to cooperate with the E core to provide a magnetic core having two apertures 24 and 26. The E cores and bars are preferably constructed of a ferrite magnetic material such as is commonly employed for pulse transformers. As described hereinafter, the memory does not rely upon a square loop hysteresis characteristic for storing information. Instead, the cores are used in the manner of a transformer core, rather than in the manner of a memory core having high retentivity in two magnetic states. Preferably, the cores have a linear magnetization characteristic.

Each word of information stored in the memory is determined by the configuration of a primary winding conductor 30 which provides a conductive path extending through the aperture 24 of core 10 for the storage of a "+," extends through both apertures 24 and 26 of core 12 for the storage of a "0," and extends through aperture 26 of core 14 for the storage of a "—." While FIGURE 1 shows only one primary winding conductor for the storage of one word having three tertiary bits, it will be understood that a memory according to the invention will normally have a large number (such as sixty-four) of primary winding conductors 30 for the purpose of storing a corresponding number of words.

Each primary winding conductor 30 is constructed as a printed winding having a ladder pattern on a sheet 36 of insulating material such as the plastic "Mylar." Each primary winding sheet 36 is provided with apertures 38 adapted to fit over the central legs 16 of the respective magnetic cores and to have sides which fit within the side legs 18 and 20 of each core. Each ladder-pattern printed primary winding conductor 30 includes side conductors 40 and 42 extending through the respective apertures 24 and 26 of the cores, and transverse conductors 44 extending between the side conductors and located between the successive cores.

Each insulating sheet 36 with a ladder-pattern printed primary winding thereon is selectively punched for the storage of a desired word prior to assembly of the insulating sheet in the cores. The conductor 42 is punched out at 46 leaving the conductor 40 threaded through the aperture 24 for the storage of a "+" at the core 10.

The conductor 40 is punched out at 48 leaving the conductor 42 passing through the aperture 26 in core 14 for the storage of a "—" at the core 14. The conductors 40 and 42 are unpunched at the core 12 so that they both conduct current through the apertures 24 and 26 of the core 12 for the storage of a "0" at the core 12. Each of the conductors 30 has two terminals 50 and 52 for connection to electronic circuits as will be described.

The central leg 16 of each of the cores 10, 12 and 14 has wound therearound a multi-turn secondary winding 54. The secondary windings 54 are preferably printed windings having a pancake configuration, the windings being printed on a secondary winding insulating sheet 56 having the same general configuration as the primary winding insulating sheets 36.

FIGURE 2 will now be referred to in describing the operation of each of the magnetic cores in the arrangement of FIGURE 1. A primary winding conductor 40 carrying a current pulse going into the paper causes a change in magnetic flux around the aperture 24 in the direction represented by the arrow 58. This change, by transformer action, induces a signal in the secondary winding 54 which appears at the output terminal 59 as a signal pulse of one polarity which may represent a stored "1." An output signal of the opposite polarity representing a stored "—" is provided when the primary winding conductor 42 of another word is energized by a current pulse going into the paper through aperture 26 to produce flux in the direction represented by the arrow 60. There is no output signal, representing a stored "0," provided at the output 59 of the secondary coil 54 when current flows simultaneously in both conductors 40' and 42' through both apertures 24 and 26 because the fluxes 58 and 60 cancel each other in the central leg 16 linked by the secondary coil 56.

The signals, described above, are induced in the secondary winding 54 during the leading edge of the interrogation pulse applied to a primary winding conductor 40. The trailing edge of each interrogation pulse causes the induction of an opposite-polarity signal in the secondary winding. Solely the signals due to the leading edge of the interrogation pulse (or the trailing edge) are sensed by strobing the sense amplifier (FIGURE 3) in the customary manner.

FIGURE 3 illustrates a memory system including a plurality of cores including those labeled 10, 12 and 14, all the cores being linked by conductors 30 each of which defines one of a plurality of words stored in the memory. The terminals 50 and 52 of each primary winding conductor 30 are connected to selection drivers 64 and selection switches 66, respectively. The drivers 64 and switches 66 are operated under the control of a decoder 68 in response to signals on input lead 70 which identifies the particular word desired to be read out from the read-only memory. The drivers 64, switches 66 and decoder 68 are conventional known circuits for the selection of one of a number of conductors or word lines in a memory. The secondary coil 54 wound on each of the cores is coupled to a respective sense amplifier 72. The several sense amplifiers each provide one digit of the interrogated word on the output leads labeled $2^0$, $2^1$, $2^2$ and $2^n$.

Thus, the operation of the read-only memory is such that every time an interrogation pulse is applied to a selected one of the primary winding conductors 30, the information bits available at the outputs of the sense amplifiers 72 represent the information bits of the selected word stored in the memory by the configuration of the selected primary winding.

The insulating sheets 36 with ladder-pattern printed windings 30 thereon may be supplied unpunched to a memory user. The user can punch the sheets to provide for the storage of a corresponding number of information words in a manner analagous to the usual punching of information on paper cards. The user can, by removing the bars 22 from the E cores, insert the punched secondary sheets in the cores. Thereafter, the user can conveniently change a word or words stored in the memory by substituting one or more punched primary sheets for one or more punched primary sheets in the memory.

What is claimed is:

1. A memory construction comprising
   a plurality of magnetic cores each having two apertures with a central magnetic leg therebetween,
   a plurality of primary windings each extending through apertures of all of said cores, a primary winding extending through solely one aperture of a core to store a "+," extending solely through the other aperture of a core to store a "—," and extending in parallel paths through both of the apertures of a core to store a "0," and
   a secondary winding wound around the central leg of each of said magnetic cores.

2. A memory construction for the storage of $m$ words each having $n$ tertiary bits, comprising
   $n$ magnetic cores each having two apertures with a central magnetic leg therebetween,
   $m$ primary windings extending through apertures of all of said cores, a primary winding extending through solely one aperture of a core to store a "+," extending solely through the other aperture of a core to store a "—," and extending in parallel paths through both of the apertures of a core to store a "0," and
   a secondary winding wound around the central leg of each of said magnetic cores.

3. A semi-permanent memory construction for the storage of $m$ words each having $n$ tertiary bits, comprising
   $n$ magnetic cores each having two apertures with a central magnetic leg therebetween,
   $m$ primary windings extending through apertures of all of said cores, a primary winding extending through solely one aperture of a core to store a "+," extending solely through the other aperture of a core to store a "—," and extending in parallel paths through both of the apertures of a core to store a "0,"
   a secondary winding wound around the central leg of each of said magnetic cores,
   means to apply an interrogation pulse through any selected one of said primary windings, and
   means to sense the signal induced in each of said secondary windings as a "+," a "—" or a "0" depending on the location of the interrogated primary winding with relation to the particular core.

4. A memory construction for the storage of $m$ words each having $n$ tertiary bits, comprising
   $m$ insulating primary sheets each having $n$ apertures therein and each having a ladder-pattern printed primary winding thereon wherein first and second side conductors extend on the two respective sides of the apertures and wherein cross conductors connect the side conductors between the apertures, a portion of the first side conductor near an aperture being punched out for the storage of a "+," a portion of the second side conductor near an aperture being punched out for the storage of a "—," and the first and second side conductors near an aperture being unpunched for the storage of a "0,"
   $n$ secondary windings,
   $n$ magnetic cores each having an E-shaped member, each having a central leg through corresponding apertures in all of said primary sheets and through one secondary winding, and each having side legs outside of one of said secondary windings, and
   each of said cores having an individual magnetic bar bridged across the ends of the central and side legs of each of said E-shaped members.

5. A semi-permanent construction for the storage of $m$ words each having $n$ tertiary bits, comprising

*m* insulating primary sheets each having *n* apertures therein and each having a ladder-pattern printed primary winding thereon wherein said pattern includes first and second side conductors corresponding to the ladder legs extend on the two respective sides of the apertures and wherein cross conductors corresponding to the ladder bars of the pattern connect the side conductors between the apertures, a portion of the first side conductor near an aperture being punched out for the storage of a "+," a portion of the second side conductor near an aperture being punched out for the storage of a "—," and the first and second side conductors near an aperture being unpunched for the storage of a "0,"

an insulating secondary sheet having *n* apertures therein each surrounded by a secondary winding,

*n* magnetic cores each having an E-shaped member with a central leg through corresponding apertures in all of said primary sheets and through one aperture of said secondary sheet, and having side legs, and a magnetic bar bridged across the ends of the central and side legs of each of said E-shaped members.

6. A semi-permanent memory construction for the storage of *m* words each having *n* tertiary bits, comprising

*m* insulating primary sheets each having *n* apertures therein and each having a ladder-pattern printed primary winding thereon wherein first and second side conductors extend on the two respective sides of the apertures and wherein cross conductors connect the side conductors between the apertures, a portion of the first side conductor near an aperture being punched out for the storage of a "+," a portion of the second side conductor near an aperture being punched out for the storage of a "—," and the first and second side conductors near an aperture being unpunched for the storage of a "0,"

an insulating secondary sheet having *n* apertures therein each surrounded by a multi-turn pancake printed secondary winding,

*n* E-shaped magnetic cores each having a central leg extending through corresponding apertures in all of said primary sheets and extending through one aperture of said secondary sheet, and having side legs extending outside said primary and secondary sheets, a magnetic bar bridge across the ends of the central and side legs of each of said E-shaped cores, means to apply an interrogation pulse through any selected one of said primary windings, and means to sense the signal induced in each of said secondary windings as a "+," a "—" or a "0" depending on the effective configuration of the interrogated primary winding.

References Cited by the Examiner

UNITED STATES PATENTS

| | | | |
|---|---|---|---|
| 2,778,005 | 1/1957 | Allen | 340—174 |
| 2,963,687 | 12/1960 | Briggs | 340—174 |
| 3,044,044 | 7/1962 | Lee | 340—174 |

IRVING L. SRAGOW, *Primary Examiner.*